(12) United States Patent
Kimura et al.

(10) Patent No.: US 7,635,732 B2
(45) Date of Patent: Dec. 22, 2009

(54) PROCESS FOR PRODUCING THERMOPLASTIC RESIN COMPOSITION

(75) Inventors: Kenji Kimura, Toyonaka (JP); Ryoji Soma, Nara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 15 days.

(21) Appl. No.: 12/078,625

(22) Filed: Apr. 2, 2008

(65) Prior Publication Data

US 2009/0170987 A1    Jul. 2, 2009

(30) Foreign Application Priority Data

Apr. 3, 2007  (JP) .............................. 2007-097148
Apr. 23, 2007 (JP) .............................. 2007-112660

(51) Int. Cl.
   *C08K 5/524* (2006.01)
(52) U.S. Cl. .................................................... 524/117
(58) Field of Classification Search ................ 524/117
   See application file for complete search history.

(56) References Cited

U.S. PATENT DOCUMENTS 5,889,095 A * 3/1999 Inui et al. .................... 524/117

FOREIGN PATENT DOCUMENTS

JP          10-273494         10/1998

OTHER PUBLICATIONS

European Search Report issued Aug. 24, 2009 in corresponding European Application No. 08 15 3524.

* cited by examiner

*Primary Examiner*—Peter Szekely
(74) *Attorney, Agent, or Firm*—Wenderoth, Lind & Ponack, L.L.P.

(57) ABSTRACT

A process for producing a thermoplastic resin composition, comprising melting-kneading a thermoplastic resin and a neutralizing agent, and melting-kneading the melting-kneaded product obtained in a first step and a compound (I):

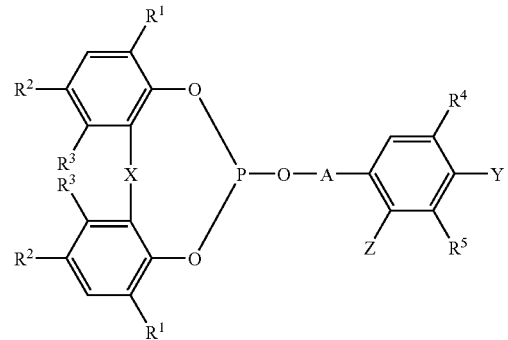

(1)

wherein two $R^1$s, two $R^2$s, $R^4$ and $R^5$ each represent independently a hydrogen atom, an alkyl group etc.; two $R^3$s each represent independently a hydrogen atom or an alkyl group; X represents a single bond, a sulfur atom or a —$CHR^6$— group, wherein $R^6$ represents a hydrogen atom, an alkyl group etc.; A represents an alkylene group or a *—$COR^7$— group, wherein $R^7$ represents a single bond or an alkylene group, and a symbol * represents a bond with an oxygen atom of a >P—O— portion; one of Y and Z represents a hydroxyl group, an alkoxy group or an aralkyloxy group, and the other of Y and Z represents a hydrogen atom, or an alkyl group.

9 Claims, 1 Drawing Sheet

PROCESS FOR PRODUCING THERMOPLASTIC RESIN COMPOSITION

TECHNICAL FIELD

The present invention relates to a process for producing a thermoplastic resin with a further improved hue, containing an antioxidant and a neutralizing agent.

BACKGROUND ART

A compound represented by the formula (I) is known to be useful as an antioxidant of a thermoplastic resin such as polyolefin from patent Publication 1, and a process for producing a thermoplastic resin composition by simultaneously blending calcium stearate which is one kind of neutralizing agents, a thermoplastic resin, and a compound (1), and melting-kneading them is specifically disclosed in patent Publication 1.

(1)

In the formula, two R's, two $R^2$s, $R^4$ and $R^5$ each represent independently a hydrogen atom, an alkyl group having a carbon number of 1 to 8, a cycloalkyl group having a carbon number of 5 to 8, an alkylcycloalkyl group having a carbon number of 6 to 12, an aralkyl group having a carbon number of 7 to 12, or a phenyl group, two $R^3$s each represent independently a hydrogen atom, or an alkyl group having a carbon number of 1 to 8, X represents a single bond, a sulfur atom or a —$CHR^6$— group, wherein $R^6$ represents a hydrogen atom, an alkyl group having a carbon number of 1 to 8, or a cycloalkyl group having a carbon number of 5 to 8, A represents an alkylene group having a carbon number of 2 to 8, or a *—$COR^7$— group, wherein $R^7$ represents a single bond, or an alkylene group having a carbon number of 1 to 8, and a symbol * represents a bond with an oxygen atom of a >P—O— portion, one of Y and Z represents a hydroxyl group, an alkoxy group having a carbon number of 1 to 8, or an aralkyloxy group having a carbon number of 7 to 12, and the other of Y and Z represents a hydrogen atom, or an alkyl group having a carbon number of 1 to 8, provided that, when Y is a hydroxyl group, one of $R^4$ and $R^5$ represents an alkyl group having a carbon number of 3 to 8, a cycloalkyl group having a carbon number of 5 to 8, an alkylcycloalkyl group having a carbon number of 6 to 12, an aralkyl group having a carbon number of 7 to 12, or a phenyl group.

[Patent Publication 1] JP-A No. 10-273494 (Claims, Example 14)

SUMMARY OF INVENTION

Recently, since a thermoplastic resin composition containing a neutralizing agent and a compound (1) has been frequently used in a material for parts and case bodies of electronic and electric products, mechanical products such as automobiles, and optical products such as television, the thermoplastic resin composition is required to have a further improved hue.

An object of the present invention is to provide a process for producing a thermoplastic resin composition containing a neutralizing agent and a compound (I), which composition has a further improved hue.

The present invention is a process for producing a thermoplastic resin composition, comprising a first step of melting-kneading a thermoplastic resin and a neutralizing agent, and a second step of melting-kneading the melting-kneaded product obtained in the first step and a compound (I).

According to the process of the present invention, a thermoplastic resin composition with a further improved hue can be obtained.

Figure 1:
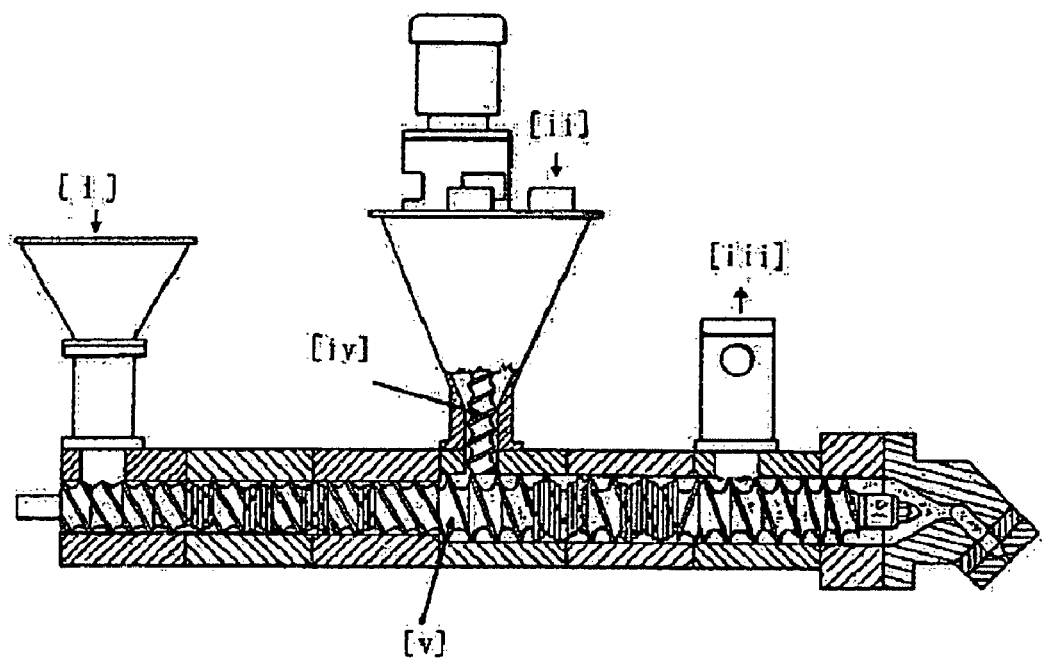
FIG. 1 is a cross-sectional view of an extrusion kneader having two charging inlets, and an air vent.

In the FIGURE, [i] is an inlet for charging a raw material used in a first step, [ii] is an inlet for charging a raw material used in a second step, [iii] is a gas vent, [iv] is a supplying feeder, and [v] is a screw.

MODE FOR CARRYING OUT THE INVENTION

The present invention will be explained in detail below.

The compound (I) used in the present invention is a compound represented by the formula (I).

In the compound (I), two $R^1$s, two $R^2$s, $R^4$ and $R^5$ each represent independently a hydrogen atom, an alkyl group having a carbon atom of 1 to 8, a cycloalkyl group having a carbon number of 5 to 8, an alkylcycloalkyl group having a carbon number of 6 to 12, an aralkyl group having a carbon number of 7 to 12, or a phenyl group.

Herein, examples of the alkyl group having a carbon number of 1 to 8 include a methyl group, a t-butyl group, a t-pentyl group and a t-octyl group.

Examples of the cycloalkyl group having a carbon number of 5 to 8 include a cyclopentyl group, a cyclohexyl group, and a cycloheptyl group.

Examples of the alkylcycloalkyl group having a carbon number of 6 to 12 include a methylcyclopentyl group, a methylcyclohexyl group, and a dimethylcyclohexyl group.

Examples of the aralkyl group having a carbon number of 7 to 12 include a benzyl group.

In the compound (I), two $R^3$s each represent independently a hydrogen atom, or an alkyl group having a carbon number of 1 to 8. Examples of the alkyl group having a carbon number of 1 to 8 include the same groups as those described above.

As $R^3$, a hydrogen atom or a methyl group is preferable.

In the compound (I), X represents a single bond, a sulfur atom, or a —$CHR^6$— group, wherein $R^6$ represents a hydrogen atom, an alkyl group having a carbon number of 1 to 8, or a cycloalkyl group having a carbon number of 5 to 8. Examples of the alkyl group having a carbon number of 1 to 8, and the cycloalkyl group having a carbon number of 5 to 8 include the same groups as those described above.

Examples of the —$CHR^6$— group include a methylene group, an ethylidene group, a propylidene group, and a 1-cyclohexylmethyl group. As X, a single bond, a methylene group or an ethylidene group is preferable. In the compound (I), A represents an alkylene group having a carbon number of 2 to 8 or a *—$COR^7$— group, wherein $R^7$ represents a single bond or an alkylene group having a carbon number of 1 to 8, a symbol * represents a bond with an oxygen atom of a >P—O— portion. Examples of the alkylene group having a carbon number of 1 to 8 include a methylene group, an ethylene group, a trimethylene group, and a tetramethylene group. As A, an alkylene group having a carbon number of 2 to 4, or the *—$COR^7$— group is preferable.

The alkylene group having a carbon number of 2 to 4 may be interrupted by a group in which a carbon-carbon bond contains a hetero atom. In this case, examples of the group containing a hetero atom include an —O—(C=O)— group and a —C(=O)—O— group. As $R^7$, an alkylene group having a carbon number of 1 to 4 is preferable.

One of Y and Z represents a hydroxyl group, an alkoxy group having a carbon number of 1 to 8, or an aralkyloxy group having a carbon number of 7 to 12, and the other represents a hydrogen atom or an alkyl group having a carbon number of 1 to 8. When Y is a hydroxyl group, it is preferable that one of $R^4$ and $R^5$ is an alkyl group having a carbon number of 3 to 8, a cycloalkyl group having a carbon number of 5 to 8, an alkylcycloalkyl group having a carbon number of 6 to 12, an aralkyl group having a carbon number of 7 to 12, or a phenyl group. Examples of the alkoxy group having a carbon number of 1 to 8 include a methoxy group, an ethoxy group, and a t-butoxy group, and examples of the aralkyloxy group having a carbon number of 7 to 12 include a benzyloxy group.

When Y in the formula (I) is a hydroxyl group, it is more preferable that Z is a hydrogen atom or a methyl group, and it is more preferable that one of $R^4$ and $R^5$ is a t-butyl group, and the other is a hydrogen atom.

In addition, when Z in the formula (I) is a hydroxyl group, it is more preferable that $R^5$ is a methyl group, Y is a hydrogen atom, one of $R^4$ and $R^5$ is a t-butyl group, and the other is a hydrogen atom.

In addition, two $R^1$s, two $R^2$s and two $R^3$s may be the same or different, respectively.

Among the compound (I), particularly preferable compounds are exemplified as follows: 6-[3-(3-t-butyl-4-hydroxy-5-methylphenyl)propoxy]-2,4,8,10-tetra-t-butyldibenzo[d,f][1,3,2]dioxaphosphepine (hereinafter, referred to as A1 in some cases), 6-[3-(3,5-di-t-butyl-4-hydroxyphenyl)propoxy]-2,4,8,10-tetra-t-butyldibenzo[d,f][1,3,2]dioxaphosphepine, 6-[3-(3,5-di-t-butyl-4-hydroxyphenyl)propoxy]-4,8-di-t-butyl-2,10-dimethyl-12H-dibenzo[d,g][1,3,2]dioxaphosphosine, and 6-[3-(3,5-di-t-butyl-4-hydroxyphenyl)propionyloxy]-4,8-di-t-butyl-2,10-dimethyl-12H-dibenzo[d,g][1,3,2]dioxaphosphosine.

An incorporation amount of the compound (I) in the thermoplastic resin composition is usually 0.005 part by weight to 1 part by weight, preferably 0.01 part by weight to 0.5 part by weight, particularly preferably 0.02 part by weight to 0.2 part by weight.

When an incorporation amount of the compound (I) is 0.005 part by weight or more, coloration resistance tends to be improved, being preferable. When the incorporation amount is 1 part by weight or less, bleeding phenomenon in which the compound (I) appears on a surface of the thermoplastic resin composition tends to be reduced, being preferable.

The neutralizing agent used in the present invention means a compound which adsorbs a chlorine ion, and means a compound which adsorbs a chlorine ion derived from the residue of a catalyst such as magnesium chloride used upon polymerization of an olefin monomer into polyolefin.

Specifically, metal soap, aliphatic amide, hydrotalcites, and oxides and hydroxides of an alkaline earth metal, preferably metal soap and hydrotalcites are exemplified.

The metal soap is a salt of fatty acid which may be substituted with a hydroxy group and a monovalent to trivalent metal. A number of carbons contained in the fatty acid is 4 to 18, preferably 10 to 18.

Examples of the metal include an alkali metal, an alkaline earth metal, an aluminum group metal, an iron group metal, and a zinc metal.

Examples of the fatty acid include stearic acid, palmitic acid, lauric acid, behenic acid, and 12-hydroxystearic acid.

Examples of the alkali metal include lithium, potassium, and sodium, and examples of the alkaline earth metal include magnesium, calcium, and barium.

As the metal soap, calcium stearate, and calcium palmitate are preferable and, among them, commercially available calcium stearate (usually, a mixture of calcium stearate and calcium palmitate) is preferable.

The fatty acid amides are preferably amides of higher fatty acid, more preferably amides of saturated or unsaturated higher fatty acid having a carbon number of 12 to 24. Examples include monoamides such as lauric acid amide, myristic acid amide, palmitic acid amide, stearic acid amide, arachidic acid amide, behenic acid amide, and erucic acid amide, and bisamides such as methylenebisbehenic acid amide, methylenebisstearic acid amide, methylenebisoleic acid amide, ethylenebisstearic acid amide, hexamethylenebisstearic acid amide, and hexamethylenebisoleic acid amide. Among them, bisamides such as methylenebisstearic acid amide, and ethylenebisstearic acid amide are preferable.

Hydrotalcites is a double salt compound represented by the following formula.

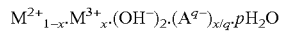

$$M^{2+}_{1-x}.M^{3+}_x.(OH^-)_2.(A^{q-})_{x/q}.pH_2O$$

In the formula, $M^{2+}$ represents at least one kind divalent metal selected from $Mg^{2+}$, $Fe^{2+}$, $Ca^{2+}$, $Zn^{2+}$, $Co^{2+}$ and $Ni^{2+}$, $M^{3+}$ represents at least one kind trivalent metal selected from $Al^{3+}$, $B^{3+}$, $Bi^{3+}$, $Fe^{3+}$ and $Mn^{3+}$, q represents a numerical value of 1 to 4, x represents a numerical value of 0 to 0.5, and p represents a numerical value of 0 to 2. $A^{q-}$ represents a q-valent anion.

Herein, examples of the q-valent anion represented by $A^{q-}$ include $OH^-$, $Cl^-$, $Br^-$, $I^-$, $ClO_4^-$, $HCO_3^-$, $C_6H_5COO^-$, $CO_3^{2-}$, $SO_2^{2-}$, $^-OOCCOO^-$, $(CHOHCOO)_2^{2-}$, $C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{4-}$, $BO_3^{3-}$, $PO_4^{3-}$, and $HPO_4^{2-}$. Particularly preferable is, for example, hydrotalcites represented by the following formula.

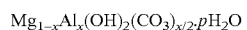

$$Mg_{1-x}Al_x(OH)_2(CO_3)_{x/2}.pH_2O$$

(wherein x and p are as defined above)

A natural mineral having the name such as hydrotalc stone, stichite, and pyroaurite is hydrotalcite in the present invention.

Among them, hydrotalcite represented by the following formula is particularly preferable.

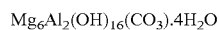

$$Mg_6Al_2(OH)_{16}(CO_3).4H_2O$$

Hydrotalcite used in the present invention may be a natural product or a synthetic product, and hydrotalcite having any crystal structure and any crystal particle size can be used. Specifically, commercially available appropriate hydrotalcite (e.g. DHT-4A, manufactured by Kyowa Chemical Industry Co., Ltd) can be used.

Oxide or hydroxide of an alkaline earth metal is oxide or hydroxide of Periodic Table Group II metal atom, and examples include calcium oxide, magnesium oxide, calcium hydroxide, and magnesium hydroxide, preferably calcium hydroxide.

An incorporation amount of the neutralizing agent in the thermoplastic resin composition is usually 0.005 to 1 part by weight, preferably 0.01 to 0.2 part by weight, particularly preferably 0.02 to 0.1 part by weight.

When an incorporation amount of the neutralizing agent is 0.005 part by weight or more, corrodability of an instrument used in melting and kneading tends to be reduced, being preferable. When the incorporation amount is 1 part by weight or less, coloration resistance tends to be improved, being preferable.

The thermoplastic resin composition of the present invention may contain, as an antioxidant other than the compound (1), the following compounds.

Phenol-based antioxidant such as 2,6-di-t-butyl-4-methylphenol, n-octadecyl 3-(3,5-di-t-butyl-4-hydroxyphenyl) propionate, pentaerythrityl tetrakis(3-(3,5-di-t-butyl-4-hydroxyphenyl)propionate), triethylene glycol bis(3-(3-t-butyl-5-methyl-4-hydroxyphenyl)propionate), 1,3,5-trimethyl-2,4,6-tris(3,5-di-t-butyl-4-hydroxybenzyl)benzene, tris(3,5-di-t-butyl-4-hydroxybenzyl) isocyanurate, 3,9-bis(2-(3-(3-t-butyl-4-hydroxy-5-methylphenyl)propionyloxy)-1,1-dimethylethyl)-2,4,8,10-tetraoxaspiro[5.5]undecane, 2,2'-methylenebis(6-t-butyl-4-methylphenol), 4,4'-butylidenebis(6-t-butyl-3-methylphenol), 4,4'-thiobis(6-t-butyl-3-methylphenol), 2-t-butyl-6-(3-t-butyl-2-hydroxy-5-methylbenzyl)-4-methylphenyl acrylate, 2(1-(2-hydroxy-3,5-di-t-amylphenyl)ethyl)-4,6-di-t-amylphenyl acrylate, dialkyl(C12-18) 3,3'-thiodipropionate, and pentaerythrityl tetrakis(3-laurylthiopropionate), as well as tris(2,4-di-t-butylphenyl)phosphite, sulfur-based antioxidant such as 3,3'-thiodipropionic acid di-n-dodecyl ester, 3,3'-thiodipropionic acid di-n-tetradecyl ester, 3,3'-thiodipropionic acid di-n-octadecyl ester, and tetrakis(3-dodecylthiopropionic acid) pentaerythrityl ester.

The thermoplastic resin composition of the present invention may contain, as a light stabilizer, the following compounds.

Benzophenone-based light stabilizer such as 2-hydroxy-4-n-octoxybenzophenone, benzotriazole-based light stabilizer such as 2-(2-hydroxy-5-methylphenyl)benzotriazole, and 2-(3-t-butyl-2-hydroxy-5-methylphenyl)-5-chlorobenzotriazole, hindered amine-based light stabilizer such as dimethyl succinate.1-(2-hydroxyethyl)-4-hydroxy-2,2,6,6-tetramethylpiperidine polycondensate, and poly[{6-(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}], 2,4-di-t-butylphenyl 3,5-di-t-butyl-4-hydroxybenzoate, and bis(2,2,6,6-tetramethyl-4-piperidyl) sebacate.

The polymer of dimethyl succinate and 4-hydroxy-2,2,6,6-tetramethyl-1-piperidineethanol is one kind of hindered amine-based light stabilizers, which has a molecular weight of 3100 to 4000, captures a radical generated by light (ultraviolet-ray), and prevents an organic material and a polymer material from deteriorating due to degradation of hydroperoxide. As such the polymer of dimethyl succinate and 4-hydroxy-2,2,6,6-tetramethyl-1-piperidineethanol, specifically, a commercially available appropriate polymer (TINUVIN622, manufactured by Ciba Specialty Chemicals) may be used.

Other additive may be added to the thermoplastic resin composition of the present invention. In that case, an incorporation amount of other additive is not particularly limited as far as the amount is in such a range that physical property of the thermoplastic resin composition is not adversely affected.

Examples of other additive which may be incorporated, include the following:

lubricant such as paraffin, low molecular weight polyethylene wax (molecular weight 10000 or less), low molecular weight polypropylene wax (molecular weight 10000 or less), stearic acid, butyl stearate, hydrogenated castor oil, and stearyl alcohol, cationic antistatic agent such as primary amine salt, tertiary amine salt, quaternary amine salt and pyridine derivative, anionic antistatic agent such as sulfated oil, soap, sulfated ester oil, sulfated amide oil, sulfated ester salt of olefin, fatty alcohol sulfate ester salt, alkyl sulfate ester salt, fatty acid ethyl sulfonate salt, alkylnaphthalenesulfonate salt, alkylbenzenesulfonate salt, succinic acid ester sulfonate salt, and phosphoric acid ester salt, nonionic antistatic agent such as partial fatty acid ester of a polyhydric alcohol, ethylene oxide adduct of fatty alcohol, ethylene oxide adduct of fatty acid, ethylene oxide adduct of fatty acid amine or aliphatic acid amide, ethylene oxide adduct of alkylphenol, ethylene oxide adduct of partial fatty acid ester of a polyhydric alcohol, and polyethylene glycol, amphoteric antistatic agent such as carboxylic acid derivative and imidazoline derivative, anti-fogging agent such as stearic acid monoglyceride, oleic acid monoglyceride, polyglycerin oleic acid ester, sorbitan monolaurate, and sorbitan monostearate.

In the present invention, an incorporation amount of the wax is preferably in a range of 0.1 to 10 parts by weight based on 100 parts by weight of the compound (I).

The thermoplastic resin used in the present invention is a polymer compound having a molecular weight of 10000 or more.

Examples of the thermoplastic resin include a polyolefin-based resin, a polyamide-based resin (6 nylon, 12 nylon etc.), polyester (polyethylene terephthalate, polybutylene terephthalate etc.), polyurethane, engineering plastic (polyphenylene ether, polycarbonate etc.).

Example of the polyolefin-based resin include polyethylene (high density polyethylene (HD-PE), low density polyethylene (LD-PE), linear low density polyethylene (LLDPE) etc.), a polypropylene-based resin, a methylpentene polymer, an ethylene/ethyl acrylate copolymer resin, an ethylene/vinyl acetate copolymer resin, polystyrenes, polystyrene (poly(p-methylstyrene), poly(α-methylstyrene) etc.), an acrylonitrile/styrene copolymer resin, an acrylonitrile/butadiene/styrene copolymer resin, a chlorine-containing polymer (polyvinyl chloride, chlorinated rubber etc.), a special acryl rubber/acrylonitrile/styrene copolymer resin, a methacryl resin, an ethylene/vinyl alcohol copolymer resin, a fluorine resin, 1,2-polybutadiene, polyisoprene, a styrene/butadiene copolymer, a butadiene/acrylonitrile copolymer, an ethylene/propylene copolymer, an ethylene/methyl methacrylate copolymer, and cyclic polyolefin. Among them, a polypropylene-based resin is preferable from a viewpoint of good molding processability.

When the propylene-based resin is used as the thermoplastic resin, specifically, examples thereof include a crystalline propylene homopolymer, a propylene-ethylene random copolymer, a propylene-α-olefin random copolymer, and a polypropylene-based block copolymer consisting of a propylene homopolymer component or a copolymer component consisting mainly of propylene, and/or a copolymer component of α-olefin. These polypropylenes may be used alone, or two or more kinds may be used by blending.

The α-olefin other than polypropylene in the polypropylene-based resin is usually α-olefin having a carbon number of 4 to 12, and examples include 1-butene, 1-pentene, 1-hexene, 4-methyl-1-pentene, 1-octene, and 1-decene, further preferably 1-butene, 1-hexene and 1-octene.

Examples of the propylene-α-olefin random copolymer include a propylene-1-butene random copolymer, a propylene-1-hexene random copolymer, and a propylene-1-octene random copolymer.

Examples of the propylene-ethylene-α-olefin copolymer include a propylene-ethylene-1-butene copolymer, a propylene-ethylene-1-hexene copolymer, and a propylene-ethylene-1-octene copolymer.

Examples of the copolymer component consisting mainly of propylene in the polypropylene-based block copolymer consisting of a propylene homopolymer component or a copolymer component consisting mainly of propylene, and a copolymer component of propylene, ethylene and/or α-olefin include a propylene-ethylene copolymer component, a propylene-1-butene copolymer component, and a propylene-1-hexene copolymer component, examples of the copolymer component of propylene, ethylene and/or α-olefin include a propylene-ethylene copolymer component, a propylene-ethylene-1-butene copolymer component, a propylene-ethylene-1-hexene copolymer component, a propylene-ethylene-1-octene copolymer component, a propylene-1-butene copolymer component, a propylene-1-hexene copolymer component, a propylene-1-octene copolymer component. A content of ethylene and/or α-olefin having a carbon number of 4 to 12 in the copolymer component of propylene, ethylene and/or α-olefin is usually 0.01 to 20% by weight.

Examples of the polypropylene-based block copolymer consisting of a propylene homopolymer component or a copolymer component consisting mainly of propylene, and a copolymer component of propylene, ethylene and/or α-olefin include a propylene-ethylene block copolymer, a (propylene)-(propylene-ethylene) block copolymer, a (propylene)-(propylene-ethylene-1-butene) block copolymer, a (propylene)-(propylene-ethylene-1-hexene) block copolymer, a (propylene)-(propylene-1-butene) block copolymer, a (propylene)-(propylene-1-hexene) block copolymer, a (propylene-ethylene)-(propylene-ethylene-1-butene) block copolymer, a (propylene-ethylene)-(propylene-ethylene-1-hexene) block copolymer, a (propylene-ethylene)-(propylene-1-butene) block copolymer, a (propylene-ethylene)-(propylene-1-hexene) block copolymer, a (propylene-1-butene)-(propylene-ethylene) block copolymer, a (propylene-1-butene)-(propylene-ethylene-1-butene) block copolymer, a (propylene-1-butene)-(propylene-ethylene-1-hexene) block copolymer, a (propylene-1-butene)-(propylene-1-butene) block copolymer, and a (propylene-1-butene)-(propylene-1-hexene) block copolymer.

When the polypropylene-based resin is used as the thermoplastic resin, it is preferably a crystalline propylene homopolymer, or a propylene-based block copolymer consisting of a propylene homopolymer component or a copolymer component consisting mainly of propylene, and a copolymer component of propylene, ethylene and/or α-olefin having a carbon number of 4 to 12, further preferably a propylene-based block copolymer consisting of a propylene homopolymer component or a copolymer component consisting mainly of propylene, and a copolymer component of propylene, ethylene and/or α-olefin having a carbon number of 4 to 12.

Crystallizability of the polypropylene-based resin is preferably high from a viewpoint of rigidity and flaw resistance. As the polypropylene-based resin having high crystallizability, a resin having 0.95 or more of a fraction of a propylene monomer unit at a center of a chain in which 5 consecutive propylene monomer units being a pentad unit in a polypropylene molecule (referred to pentad fraction expressed in [mmmm]), which is used as an index of crystallizability, and is obtained according to the method published by A. Zambelli et al. (Macromolecules 6, 925, 1973) is preferable.

A process for producing the thermoplastic resin is not particularly limited, but example, a thermoplastic resin produced by the known polymerization method using the previously known appropriate polymerization catalyst. Alternatively, a commercially available thermoplastic resin may be used.

When the polypropylene-based resin is used as the thermoplastic resin, examples of a polymerization catalyst include a Ziegler-type catalyst, a Ziegler-Natta-type catalyst, a catalyst system consisting of a Periodic Table Group IV transition metal compound having a cyclopentadienyl ring, and alkylaluminoxane, and a catalyst system consisting of a Periodic Table Group IV metal compound having a cyclopentadienyl ring, a compound which reacts therewith to form an ionic complex, and an organic aluminum compound.

Examples of a method of polymerizing the polypropylene-based resin include a slurry polymerization method with an inert hydrocarbon solvent, a solvent polymerization method of continuously performing them, a liquid phase polymerization method without a solvent, and a liquid phase-gas phase polymerization method, and these polymerization methods may be a batch process or a continuous process, and may be a method of producing the polypropylene-based resin at one stage, or a method of producing the resin at a multistage of two or more stages. Particularly, an example of a process for producing the polypropylene-based block copolymer consisting of a propylene homopolymer component or a copolymer component consisting mainly of propylene, and a copolymer component of propylene, ethylene and/or α-olefin having a carbon atom number of 4 to 12 includes preferably a production process of a multi-stage of at least two stages consisting of a stage of producing a propylene homopolymer component or a copolymer component consisting mainly of propylene, and a stage of producing a copolymer component of propylene, ethylene and/or α-olefin having a carbon atom number of 4 to 12.

A melt index (MI) of the thermoplastic resin is not particularly limited, but for example, in the case of the polypropylene-based resin, it is preferable that a value measured under the condition of JIS K 7210 (1976) Table 1-Condition 14 is in a range of 0.01 to 100 g/10 min from a viewpoint of molding processability.

The production process of the present invention comprises a first step of melting-kneading a thermoplastic resin and a neutralizing agent, and a second step of melting-kneading the melting-kneaded product obtained in the first step, and a compound (I).

In the first step, by performing melting and kneading at a temperature of usually at least a melting point of the neutralizing agent or higher, preferably at a temperature higher than a melting point by 50 to 150° C., the neutralizing agent can be almost uniformly dispersed in the thermoplastic resin.

In the first step, from a viewpoint of improvement in a hue, it is preferable that melting and kneading is performed without substantially containing the compound (I). "Without substantially containing the compound (I) in the first step" specifically means that the compound (I) is melting-kneaded at 0.01 part by weight or less, preferably 0.001 part by weight or less based on 100 parts by weight of the thermoplastic resin.

In the second step, by performing melting and kneading at a temperature at least higher than a melting point of the compound (I), preferably at a temperature higher than a melting point by 50 to 150° C., the compound (I) can be almost uniformly dispersed in the thermoplastic resin composition.

The first step and the second step may be directly connected and, in this case, the second step begins when the compound (I) is mixed.

In the first step and the second step, melting-kneading usually uses batch-manner kneaders such as a Banbury mixer, or continuous kneaders such as an extruder. Industrially, among kneaders, an extruder equipped with a multiaxial (such as biaxial) or monoaxial screw is preferable due to better productivity. Particularly, a multiaxial extruder tends to be excellent in dispersing the compound (I), the neutralizing agent and other additive in the thermoplastic resin composition, being preferable. In the case of the extruder, by controlling a temperature in a range of 150° C. to 300° C., preferably 170° C. to 270° C. at a heating-mixing part such as a part equipped with a screw, the thermoplastic resin composition can be produced.

Alternatively, when a controlled temperature is set to become gradually higher from a charging inlet, and controlled so that a temperature of an adapter part and a die part is the same as or higher than a temperature of a heating-mixing part, production stability is improved, being preferable.

As described in Examples 5 and 6, the melting-kneaded product obtained in a first step is taken out, and a second step may be performed separately, and in the case of use of an extrusion kneader, raw materials necessary in a first step such as a thermoplastic resin and a neutralizing agent may be placed through [i] of FIG. 1, and the compound (I) necessary in a second step may be placed through [ii] of FIG. 1.

Additives other than the thermoplastic resin, the neutralizing agent and the compound (I), such as a phenol-based antioxidant, a sulfur-based antioxidant, and a hindered amine-based stabilizer may be placed at a first step, or at a second step, or at both of a first step and a second step, and a method of placing the additives at a first step is preferable.

The thus obtained thermoplastic resin composition is a composition with an improved hue, and also in a molded article obtained by heating the resin into the flowing state, and molding-processing this, a hue is improved. Herein, molding processing means pressing the thermoplastic resin composition into a mold, and solidifying this and, specifically, molding processing such as press molding, injection molding, extrusion molding, blow molding, heat molding, and compression molding is exemplified.

The thermoplastic resin composition can be used as a molded article such as parts and case bodies of electronic or electric products, mechanical products such as automobiles, optical products such as television, or livingware such as food containers or wrapping materials by molding processing by further adding a filler, a coloring agent and an antistatic agent, if necessary.

EXAMPLES

The present invention will be explained in more detail below by way of Examples. Part and % mean a weight basis unless otherwise is indicated.

In Examples, the following were used. Thermoplastic resin: Polypropylene (MI: about 12) Compound (I-1): 2,4,8,10-Tetra-t-butyl-6-[3-(3-methyl-4-hydroxy-5-t-butylphenyl)propoxy]dibenzo[d,f][1,3,2]dioxaphosphepine, melting point 115° C.

Other antioxidant: Tris(2,4-di-t-butylphenyl) phosphite (hereinafter, referred to as Add-1 in some cases) Other additive: Polymer of dimethyl succinate and 4-hydroxy-2,2,6,6-tetramethyl-1-piperidineethanol (hereinafter, referred to as Add-2 in some cases)

Example 1

Into a labo plastomill 4C150 (batch-type kneader manufactured by Toyo Seiki Seisaku-Sho, Ltd.) heated at 250° C. were placed 100 parts of polypropylene and 0.02 part of calcium stearate (melting point 145 to 160° C.), the system was placed under the nitrogen atmosphere, and the mixture was kneaded at 250° C. and 30 rpm for 5 minutes (the foregoing is first step). Subsequently, a lid of the labo plastomill was opened, 0.1 part of the compound (1-1) was added, and the mixture was kneaded at 250° C. and 30 rpm for 5 minutes under the nitrogen atmosphere (the foregoing is second step) to obtain a thermoplastic resin composition. For measuring a hue of the composition, a pressed sheet having a thickness t=1 mm was obtained at 230° C. using a pressing machine. A YI value of this sheet was measured according to JIS K7105. Results are shown in Table 1.

Examples 2 to 4

According to the same manner as that of Example 1 except that an amount of calcium stearate and a kneading time at a second step were as shown in Table 1, compositions were obtained.

Comparative Example 1

Into a labo plastomill heated at 250° C. were placed 100 parts of polypropylene, 0.02 part of calcium stearate, and 0.1 part of to the compound (I), the system was placed under the nitrogen atmosphere, and the mixture was kneaded at 250° C. and 30 rpm for 5 minutes (the foregoing is kneading under the condition corresponding to that of the first step of Example 1, provided that the compound (1-1) is added at the first step). Then, a lid of the labo plastomill was opened, and the mixture was kneaded again at 250° C. and 30 rpm for 5 minutes (the foregoing is kneading under the condition corresponding to that of the first step of Example 1, provided that since the compound (I) has been added in the second step, it is not added at the second step.)

A pressed sheet having a thickness t=1 mm was obtained at 230° C. using a pressing machine. A YI value of this sheet was measured using a chromatometer, and results are shown in Table 1.

Comparative Examples 2 to 3

According to the same manner as that of Comparative Example 1 except that an amount of calcium stearate was as described in Table 1.

TABLE 1

|  | Thermo plastic resin (part) | Neutralizing agent (part) | Compound (I-1) | | | YI value |
|---|---|---|---|---|---|---|
|  |  |  | Addition amount (part) | First step kneading time (min) | Second step kneading time (min) |  |
| Example 1 | 100 | 0.02 | 0.1 | 5 | 5 | 5.453 |
| Example 2 | 100 | 0.02 | 0.1 | 5 | 10 | 5.717 |
| Example 3 | 100 | 0.04 | 0.1 | 5 | 5 | 6.180 |
| Example 4 | 100 | 0.04 | 0.1 | 5 | 10 | 6.157 |
| Comparative Example 1 | 100 | 0.02 | 0.1 | 0 | 10 | 6.857 |
| Comparative Example 2 | 100 | 0.04 | 0.1 | 0 | 10 | 7.093 |
| Comparative Example 3 | 100 | 0.08 | 0.1 | 0 | 10 | 7.330 |

As apparent from Table 1, it is seen that, even when a kneading time is the same, a YI value is low and a hue is improved in Examples in which the first step and the second step are performed.

Example 5

One hundred parts of polypropylene, 0.04 part of calcium stearate and 0.06 part of Add-1 were mixed, the mixture was kneaded at 260° C. and a screw rotation number of 60 rpm using a biaxial extruder having a diameter of 30 mm under the nitrogen atmosphere, to obtain a pellet [1] (the foregoing is first step). One hundred parts of this pellet [1] and 0.03 part of the compound (I) were kneaded at 230° C. and a screw rotation number of 80 rpm using a biaxial extruder having a diameter of 30 mm under the nitrogen atmosphere, to obtain a pellet [2] (the foregoing is a second step) This pellet [2] was pressed into a sheet having a thickness of 1 mm with a pressing machine, and a YI value was measured using a chromatometer. Results are shown in Table 2.

Example 6

According to the same manner as that of Example 5 except that, in a first step, 0.03 part of Add-2 was further used in addition to polypropylene, calcium stearate and Add-1, a composition was obtained. Results are shown in Table 2.

TABLE 2

| | Pellet [1] | | | | | Pellet [2] | | |
|---|---|---|---|---|---|---|---|---|
| | Thermoplastic resin (part) | Neutralizing agent (part) | Compound (I-1) (part) | Add-1 (part) | Add-2 (part) | Pellet [1] (part) | Compound (I-1) (part) | YI value |
| Example 5 | 100 | 0.04 | — | 0.06 | — | 100 | 0.03 | 3.71 |
| Example 6 | 100 | 0.04 | — | 0.06 | 0.03 | 100 | 0.03 | 3.66 |

What is claimed is:

1. A process for producing a thermoplastic composition, comprising a first step of melting-kneading a thermoplastic resin and a neutralizing agent, and a second step of melting-kneading the melting-kneaded product obtained in the first step, and a compound (I) represented by the following formula (I)

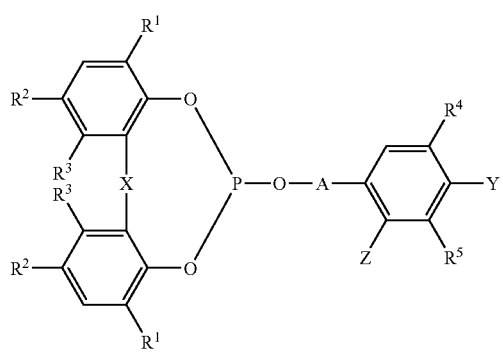

(1)

(wherein two $R^1$s, two $R^2$s, $R^4$ and $R^5$ each represent independently a hydrogen atom, an alkyl group having a carbon number of 1 to 8, a cycloalkyl group having a carbon number of 5 to 8, an alkylcycloalkyl group having a carbon number of 6 to 12, an aralkyl group having a carbon number of 7 to 12, or a phenyl group, two $R^3$s each represent independently a hydrogen atom, or an alkyl group having a carbon number of 1 to 8, X represents a single bond, a sulfur atom or a —$CHR^6$— group, wherein $R^6$ represents a hydrogen atom, an alkyl group having a carbon number of 1 to 8, or a cycloalkyl group having a carbon number of 5 to 8, A represents an alkylene group having a carbon number of 2 to 8, or a *—$COR^7$— group, wherein $R^7$ represents a single bond, or an alkylene group having a carbon number of 1 to 8, and a symbol * represents a bond with an oxygen atom of a >P—O— portion, one of Y and Z represents a hydroxyl group, an alkoxy group having a carbon number of 1 to 8, or an aralkyloxy group having a carbon number of 7 to 12, and the other represents a hydrogen atom, or an alkyl group having a carbon number of 1 to 8, provided that, when Y is a hydroxyl group, one of $R^4$ and $R^5$ represents an alkyl group having a carbon number of 3 to 8, a cycloalkyl group having a carbon number of 5 to 8, an alkylcycloalkyl group having a carbon number of 6 to 12, an aralkyl group having a carbon number of 7 to 12, or a phenyl group).

2. The process according to claim 1, wherein the neutralizing agent is at least one kind selected from a metal soap, aliphatic amide, hydrotalcites, and oxide and hydroxide of an alkaline earth metal.

3. The process according to claim 1, wherein the neutralizing agent is used at 0.005 part by weight to 1 part by weight, and the compound (I) is used at 0.005 part by weight to 1 part by weight, based on 100 parts by weight of the thermoplastic resin.

4. The process according to claim 1, wherein at least one kind stabilizer selected from a phenol-based antioxidant, a sulfur-based antioxidant, and a hindered amine-based stabilizer is further incorporated at the first step.

5. A method for stabilizing a thermoplastic resin, comprising a first step of melting-kneading a thermoplastic resin and a neutralizing agent, and a second step of melting-kneading the melting-kneaded product obtained in the first step and a compound (I).

6. A process for producing a molded article, comprising molding-processing the thermoplastic resin composition obtained by the process as defined in claim 1.

7. A process for producing a molded article, comprising molding-processing the thermoplastic resin composition obtained by the process as defined in claim 2.

8. A process for producing a molded article, comprising molding-processing the thermoplastic resin composition obtained by the process as defined in claim 3.

9. A process for producing a molded article, comprising molding-processing the thermoplastic resin composition obtained by the process as defined in claim 4.

* * * * *